A. S. MYERS.
PLANT HOLDER.
APPLICATION FILED APR. 16, 1913.
1,077,423.
Patented Nov. 4, 1913.
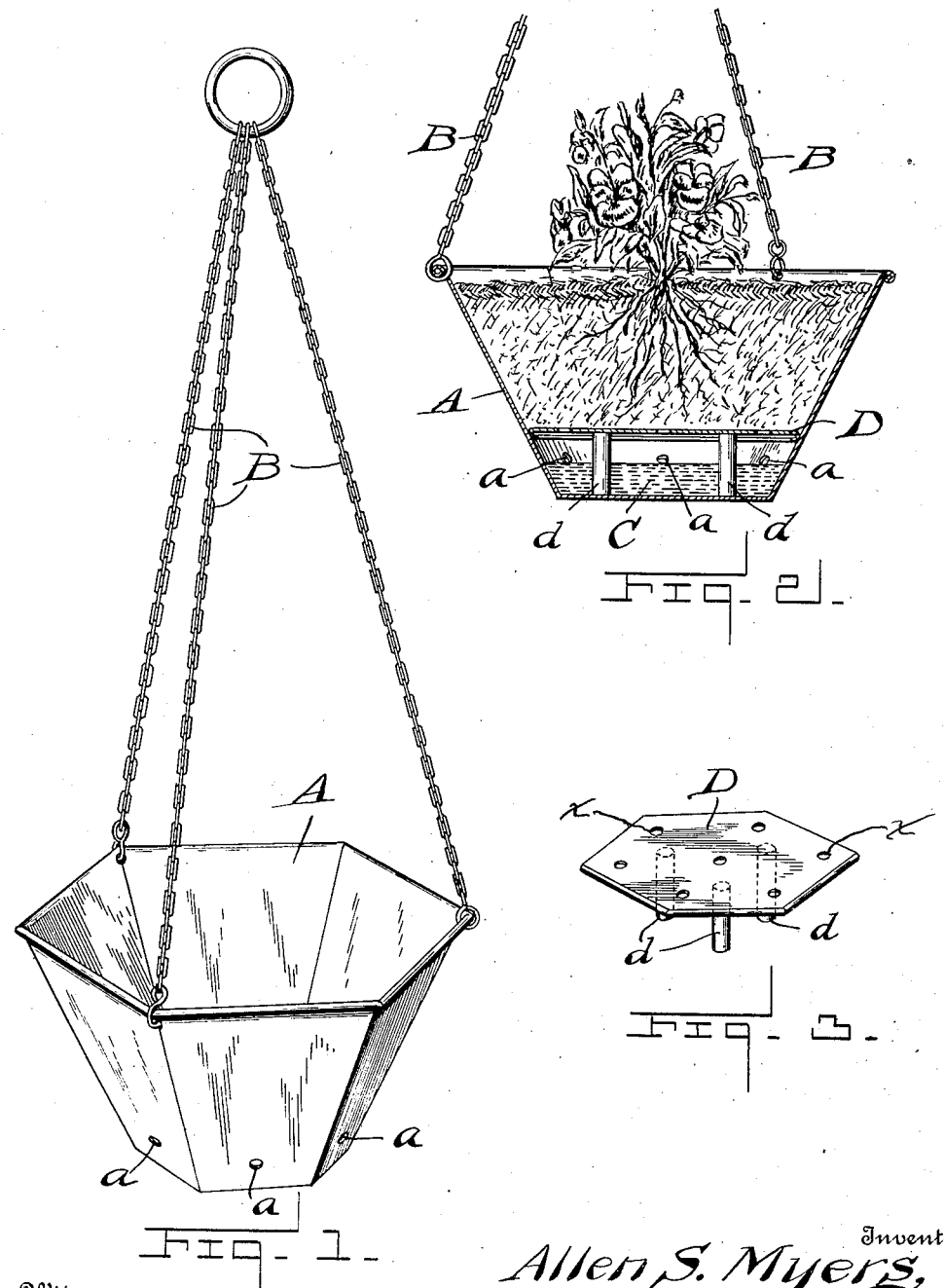

UNITED STATES PATENT OFFICE.

ALLEN S. MYERS, OF ALTOONA, PENNSYLVANIA.

PLANT-HOLDER.

1,077,423.  Specification of Letters Patent.  Patented Nov. 4, 1913.

Application filed April 16, 1913. Serial No. 761,445.

*To all whom it may concern:*

Be it known that I, ALLEN S. MYERS, a citizen of the United States, residing in Altoona, in the county of Blair and State of Pennsylvania, have invented certain new and useful Improvements in Plant-Holders, of which the following is a specification.

The object of this invention is to provide a strong, light and durable holder for ornamental vines, ferns and flowering plants, which is so constructed as to promote in a simple way the growth of the plants.

I preferably embody my invention in a hanging basket, the body of which is by preference made of copper or galvanized metal, and which may be suspended by chains, wires or other suitable means. The basket body may be given any desired shape but is of course open at the top and closed at the bottom and on all sides there being, however, holes formed in the sides of the basket a suitable distance above the bottom thereof to provide an overflow for water which the basket contains when in use. A false bottom or platform is arranged in the basket a short distance above the bottom thereof and just above the overflow holes in the basket sides. This is supported on standards which rest on the bottom of the basket and which has openings in it which permit water to pass down through it to the bottom of the basket and also permit moisture to rise through it to the roots of the plants.

In the accompanying drawings:—Figure 1 is a perspective view of a plant holder embodying my improvements. Fig. 2 shows a vertical central section thereof and illustrates how the soil, plant and water are disposed in the basket. Fig. 3 is a perspective view of the false bottom or platform.

The basket body A may be given any desired ornamental shape, and it may be suspended by wires, chains or other suitable supporting means B. The basket is open at the top and closed at the bottom and sides, but has perforations $a$ formed in the sides a suitable distance above the bottom to provide a water space C.

D indicates a false bottom or partition which is provided with standards $d$ resting on the bottom of the basket and which are so arranged as to prevent the partition from tilting. The false bottom or partition is formed with openings $x$ which permit water passing down through the soil to enter the water space C and they also permit moisture to rise into the soil to supply the roots of the plant. The false bottom D is removable and is arranged a short distance above the side openings $a$. After the partition is placed in the basket the soil and plant are arranged in the basket on top of the partition in the manner indicated in Fig. 2.

When the plant is watered the soil is thoroughly moistened and the superfluous liquid passes down through the openings $x$ into the water space C. The openings $a$ prevent the water from rising too high in the water space and in this way, while the soil is kept moist, it is prevented from getting too wet.

I claim as my invention:—

1. A plant holder, comprising a soil receptacle having perforations in its sides an appreciable distance above the bottom thereof to permit the overflow of water and to prevent the rise of water above them, and a removable false bottom provided with holes to freely permit the passage of water through it and which is supported in the receptacle above the overflow openings therein and above any possible water level in such receptacle.

2. A plant holder, comprising a soil receptacle having perforations in its sides an appreciable distance above the bottom thereof to permit the overflow of water and to prevent the rise of water above them, a removable false bottom or partition having holes through it to permit the free passage of water and standards attached to the middle portion of the partition which support it in the receptacle above the overflow perforations and above any possible water level in such receptacle.

In testimony whereof, I have hereunto subscribed my name.

ALLEN S. MYERS.

Witnesses:
EDWIN L. DIVELY,
EUGENE S. MEYERS.